Patented June 20, 1939

2,163,567

UNITED STATES PATENT OFFICE 2,163,567

BONDED FIBROUS INSULATING MATERIAL

Jesse Howell Gregory, Wheaton, Ill., assignor to American Rock Wool Corporation, Wabash, Ind., a corporation of Indiana No Drawing. Application August 27, 1937, Serial No. 161,338

11 Claims. (Cl. 154—44)

The present invention relates to the production of an incombustible, fibrous insulating material carrying a water-repellent binder. More specifically, the present invention is directed to the production of a self-sustaining felted mass of incombustible fibers, preferably slag wool fibers or rock wool fibers, said fibers being spacedly felted together to derive a relatively uniform mass. The felt bat, or agglomerate of the present invention consists of a relatively uniform mass of approximately definitely spaced fibers, said product being water-repellent, fire resistant, vermin proof, moderately heat resisting, of low density, possessed of sufficient strength and rigidity to permit handling without undue distortion and having high thermal insulating efficiency.

It has been proposed to provide slag wool or rock wool in felt form with a rosin binding; however, such rosin-treated felts have several disadvantages. For example, a binder of ordinary rosin, together with a plasticizer therefor, has a melting point of 100° F. At this temperature, such a binder becomes soggy, shapeless and incapable of sustaining itself. Consequently, a felt of the organic fibers tends, when subjected to this temperature or a higher temperature, to collapse and fall apart when handled unless reenforced by being wrapped around a piece of cardboard or other mechanical stiffening agent.

Mineral wool felt is used as an insulating material in attics and under roofs, where the material is subjected to high temperatures during the summer season, and temperatures of 120° F. and 130° F. are not uncommon temperatures to which the felt may be subjected and in some cases, the fibers and felts, bats or agglomerates, made therefrom may, under extreme summer temperatures, be subjected to temperatures in the neighborhood of 140° F. to 150° F. It is therefore of paramount importance to provide a felt, bat or agglomerate having a binder capable of resisting relatively high temperatures of the character referred to, to thereby allow the mineral wool bat or felt to maintain an optimum stiffness and the spaced position of its fibers.

It may be pointed out that the felts, bats or agglomerates of the present invention are highly water-resistant in that such entities will float indefinitely on water; that the entities will not crush or settle materially when subjected to temperatures in the neighborhood of 150° F. and that a low density product can be produced if desired.

The felted incombustible fibers of the present invention, preferably mineral wool fibers, are provided with a binder and/or a coating of a mixture of a resin and a water-insoluble resinate soap, sufficient of the water-insoluble soap being present in the mixture to maintain the melting point of the mixture above the melting point of the resin component. The plasticized rosin or resin utilized in accordance with the present invention is one which is normally incapable of causing the felt to be self-sustaining. Therefore, it is within the province of the present invention to use any natural or synthetic plasticized resin possessing adhesive properties and which is normally incapable of causing the felt to be self-sustaining at high temperatures, as for example, 140° to 150°, said rosin having mixed therewith a water insoluble soap whereby the impregnated felt is self-sustaining at a temperature of approximately 140° to 150° by virtue of the presence of the metal soap. By varying the amount of water-insoluble soap in the mixture, a method is provided for controlling the melting point of the binder. Usually, although not necessarily, enough of the saponifying agent is added to the rosin or resin so as to saponify one-third to two-thirds of the rosin or resin or resin acids or acidic resinous materials used. The water-insoluble resinates act as a hardening and stiffening agent for the resin, as for example, rosin, and therefore, is desirable, if not necessary, to provide the binder with a modifying or plasticizing agent. It may be pointed out that the function of the hardening agent is two-fold; it not only hardens and toughens the rosin or resin, but it also raises its melting point. Since the hardened rosin is more brittle and has a higher melting point, it would be naturally supposed that it would require much more modifying or plasticizing agent to reduce it to a state of adhesiveness at which it would not be brittle, and that when such a point is reached, the melting point of the resulting mass would have dropped somewhere within the range of rosin itself. It has been discovered, on the contrary, that such is not true. It has been discovered that it requires only a slightly higher proportion of modifying agent to be added to the hardened rosin which, as stated, is a mixture of the resinous soap and rosin, than is necessary to add to a plain rosin, as for example, pine rosin, and that the hardened rosin, together with the plasticizing agent, produces an adhesive material to bind the inorganic fibers of the invention into a more coherent mass having an approximately predetermined space relationship to one other. The so produced binding material is spread over the fibers in the form of a film or coalesced over the fibers.

In accordance with the present invention, any suitable resin, as for example, colophany, or pine rosin, is melted and there is mixed therewith a sufficient amount of a metal containing compound to saponify merely a portion of the rosin. The preferred saponifying agents are the hydroxides or oxides of the alkaline earth metals, and particularly calcium compounds, as for example, calcium hydroxide, calcium hydrate or lime. The melting point of the hardened rosin is controlled by controlling the amount of rosin that is saponified. As previously stated, it is preferred to saponify from about one-third to two-thirds of the resinous acids or of the resinous material. The resulting mass, after being permitted to cool, is dissolved in a suitable solvent. Broadly, almost any volatile solvent may be used, although it is preferred to use petroleum naphtha or gasoline and the like.

The time required for placing the mix in solution may be materially reduced by breaking the mix into small particles and vigorously agitating the particles in the solvent. As before stated, it is necessary to modify the mixture of rosin and rosin soap, or resin and resin soap, since the composite limed rosin has a much higher melting point than ordinary rosin and therefore exhibits a tendency to be brittle. As a binding and stiffening agent, it will be of little value unless this brittleness is modified. Various modifying or plasticizing agents may be used to impart to the composite rosin metallic soap the physical property of resilience so essential to its efficient use as an element of a mineral wool felt, bat or agglomerate. Preferably, a mixture of mineral oil and paraffin, after being heated together, is added to the resinous product. This may be added to the composite rosin-metallic soap material either before or after the latter is placed in solution in a naphtha.

The following is a preferred example of a suitable composition for coating the inorganic fibers, such as mineral fibers:

| | Per cent by weight |
|---|---|
| Pine rosin | 70 |
| Calcium hydrate | 5 |
| Mineral oil | 20 |
| Paraffin | 5 |

While in the above example, the calcium hydrate in the compound is 5% by weight, on the composition, or a little more than 7% based on the weight of the rosin, it is recognized that less or more calcium hydrate, or its equivalent, calcium oxide, may be added; for example, under certain circumstances, the calcium hydrate may be increased to 9% based on the weight of the rosin, or even to 11%. There is, of course, a practical limit as to the amount of metal compound saponifying agent which may be added, since as the latter increases, there is a tendency for the metal saponifying hydroxide to be suspended in the colloidal solution of the mineral oil and paraffin, or like solvent. Further, if a large proportion of saponifying agent, as for example, calcium hydrate, were used, the composite binding material will not be so well adapted to be used in conjunction with a secondary binding material, such as for example, sodium silicate. The amount of mineral oil and paraffin may be greatly varied and still come within the present invention. If a smaller proportion of mineral oil is used, there is a tendency to produce a stiffer bat. It is not intended to be limited to the specific percentages of mineral oil and paraffin, as it is obvious that with different kinds of resins, the amount of these plasticizing materials will vary. The point is that sufficient of the plasticizers should be added to cause the hardened rosin to lose its brittleness.

Instead of using mineral oil, rosin oil may be used and, in some cases, certain fatty acids and vegetable oils. The drying oils, such as linseed oil, would not be satisfactory due to their tendency to oxidize and harden upon standing, which would cause the binding material to become brittle and lose its effectiveness as a binding agent. Mineral oil is set forth as an example of a suitable plasticizing agent because of its relative cheapness. Instead of using paraffin wax, other types of wax may be used, as for example, beeswax or montan wax.

Instead of using lime as the saponifying agent for the resin acids, magnesium compounds, such as magnesium oxide, zinc compounds, such as zinc oxide, barium compounds, such as barium oxide, manganese compounds exemplified by manganese dioxide, and lead compounds, exemplified by lead oxides, may be used. However, manganese oxide has the disadvantage in that it tends to produce a resinate which is not so soluble in the solvents, such as petroleum naphtha. Zinc oxide gives better results from this standpoint and a mixture of calcium and zinc oxides as, for example, 2% of magnesium oxide and 5% of zinc oxide based on the weight of the rosin, may be used. It is of course necessary that the metal resinate formed be soluble in the solvent used, which is preferably a volatile solvent and more specifically petroleum naphtha, or the like, or at least from mineral springs. The soaps, such as aluminum stearate, function as fairly good waterproofing agents but do not possess the necessary stiffening properties requisite for the binder of the present invention. In other words, the function of the binder utilized as an ingredient of the mineral fibers produced in accordance with the present invention, is to not only water-proof but to stiffen the mineral wool.

Using the binder set forth in the above illustrative example, adequate stiffening, together with adequate water-proofing of the felt is obtained when the mineral wool contains 3% by weight of the binder. Obviously, the amount of binder present in the mineral wool agglomerate, felt or bat, may be varied in accordance with the particular character of the mineral wool and the use to which it is to be put and the conditions under which the composite agglomerate is used. It may be stated that 5% of the binder may be used and that the upper limit of desirability and effectiveness of the binder is about 10% of the same, based on the weight of the mineral wool. Further, it is recognized that under some circumstances, the amount of binder based on the weight of the mineral wool, or other incombustible fiber, may be reduced to about 1%.

Utilizing the binder herein set forth, it is possible to produce a bat, or felt, of slag wool, rock wool, or glass wool of much lower density than with any other known mineral wool binding agent. The minimum density obtainable in using other comparable binders is about 8 pounds per cubic foot. It is possible by using the binder of the present invention, to produce perfectly shaped and reasonably strong and resilient felts or bats having densities as low as 4 pounds per cubic foot. It is not to be inferred that extremely low density bats are universally preferable commercially, but it is obviously advantageous to vary the density of the bat or felt so as to meet specific conditions. Utilizing the present binder a low density bat or felt or agglomerate is produced which is sufficiently stiffened and bound together to prevent settling and crushing together under ordinary conditions of use. The mineral wool coated or filmed with the binder herein set forth, when subjected to a humid atmosphere, absorbs only three-tenths of one per cent of water. A bat having a density of 6 pounds per cubic foot has a thermal resistance of ±0.27 British thermal units per square foot, per degree Fahrenheit, per one inch of thickness, per hour.

The rock wool herein referred to is made, as is well known in the prior art, by melting suitable limestone or magnesium limestone, including argillaceous varieties in a suitable vessel, such as a cupola, the latter being positioned adjacent a blow or settling chamber. The cupola discharges a stream, or a plurality of streams, of the molten material from a jet or plurality of jets of steam, air, or any other suitable gas, whereby the molten material is shredded to form fibers and blown into the adjacent blow or settling chamber. The composite binder of the present invention is preferably applied to the fibers before they enter the blow chamber, but the binder may, if desired, be applied to the fibers by blowing the binder into the blow chamber with the steam blast while the fibers are suspended in the chamber. In other words, in the preferred method of applying the binder, the binder is applied or intermingled with the blast before the molten material enters the chamber, and the so-treated blast is used to carry or project the molten lava into the blow chamber. Of course, it is quite desirable that the binding composition be applied to the fibers while they are hot enough to melt the solid ingredients of the binder. It may be stated that the compositions set forth in the illustrative example is adapted to be dissolved in petroleum naphtha and satisfactory results have been obtained when 3 pounds of the binding composition is dissolved in a gallon of the naphtha.

The manner of applying the composition dissolved in the solvent is well known in the prior art and it need not be set forth in detail.

It may be stated that the use of paraffin in the above mixture may be dispensed with entirely, provided the binder is not intended to be used with sodium silicate; however, when the binder is to be used with sodium silicate, the presence of the paraffin gives to the composite insulating bat or felt, greater water resistance. No chemical reaction takes place between the wax and sodium silicate, but the physical effect of the presence of the paraffin in the sodium silicate materially increases the water repellency of the bat or felt. It may be stated that sodium silicate is an economical binder and stiffener but its caustic properties affect the mineral wool and render it entirely too brittle for the production of satisfactory mineral wool bats.

It has been discovered that when using the hardened rosin or resin in conjunction with sodium silicate, that the action of the sodium silicate upon the mineral wool fibers is prevented or substantially inhibited, while at the same time, the production of a stiffer bat is accomplished. It may be stated that the sodium silicate should not be mixed with the solution containing the hardened resin as hereinbefore set forth prior to the application of silicate and hardened resin to the inorganic fibers, as a combination of the two, due to the unneutralized acids, produces a granular precipitate which cannot be effectively distributed upon the fibers; therefore, the inorganic fibers, after they are shredded, should have first spread thereupon sodium silicate binding material and then the hardened resin material or alternately the hardened resin material may be spread first and the sodium silicate secondly. It is to be understood that the sodium silicate is to be applied through one pipe leading into the shredding chamber and the hardened resin in solution is to be applied through another pipe, these pipes being adapted to pour or spray these binding materials directly upon the molten rock wool, slag wool or glass wool in the order named, or simultaneously onto the rock wool or the like, as the latter is shredded into fibers. If desired, either one of the binding materials may be fed to the blast through a steam blast pipe and nozzle in a manner well known to the art.

While wax and oil have been set forth as the preferred plasticizers, it is desired to point out that it is within the province of the present invention to plasticize the resin or rosin with any of the prior art plasticizers. In some instances, as pointed out, the use of paraffin or similar wax may be dispensed with, and the mineral oil or its equivalent, as set forth, used as the plasticizer.

The present invention is applicable to slag, wool, glass wool, rock wool, irrespective of the chemical composition of the wool. The invention may be applied to any of the mineral wool discussed in Bulletin No. 61 of the State Geological Survey of Illinois, Urbana, 1934, said Bulletin being entitled "Rock Wool from Illinois Mineral Resources".

This application is a continuation in part of application, Serial No. 41,587, filed September 21, 1935.

I claim:

1. As a new article of manufacture, an impregnated mineral wool felt, the fibers of which are coated and felted together with a mixture of a plasticized rosin having a melting point of at least 100° F. and normally incapable of causing the felt to be self-sustaining at high temperatures and a water insoluble alkali metal soap, said impregnated felt being self-sustaining at a temperature ranging from approximately 140° to 150° F. due to the presence of said metal soap.

2. As a new article of manufacture, an impregnated mineral wool felt, the fibers of which are coated and felted together with a mixture of a plasticized rosin having a melting point of at least 100° F. and normally incapable of causing the felt to be self-sustaining at high temperatures and a calcium rosinate soap, said impregnated felt being self-sustaining at a temperature ranging from approximately 140° to 150° F. due to the presence of said calcium rosinate soap.

3. As a new article of manufacture, an impregnated mineral wool felt, the fibers of which are felted together with 1% to 10% of a mixture of a plasticized rosin having a melting point of at least 100° F. and normally incapable of causing the felt to be self-sustaining at high temperatures and a water insoluble metal rosinate soap, said impregnated felt being self-sustaining at a temperature ranging from approximately 140° to 150° F. due to the presence of said metal soap.

4. As a new article of manufacture, an impregnated mineral wool felt, the fibers of which are felted together with 1% to 10% of a mixture of a plasticized rosin having a melting point of at least 100° F. and normally incapable of causing the felt to be self-sustaining at high temperatures and a water-insoluble alkali metal soap, said impregnated felt being self-sustaining at a temperature ranging from approximately 140° to 150° F. due to the presence of said metal soap.

5. As a new article of manufacture, an impregnated mineral wool felt, the fibers of which are felted together with 1% to 10% of a mixture of a plasticized rosin having a melting point of at least 100° F. and normally incapable of causing the felt to be self-sustaining at high temperatures and a calcium rosinate soap, said impregnated felt being self-sustaining at a temperature ranging from approximately 140° to 150° F. due to the presence of said calcium rosinate soap.

6. A non-alkaline solution for the binding and stiffening of mineral wool fibers comprising the water-insoluble soap resulting from reacting together a mixture of rosin, an alkaline earth hydroxide or oxide, and a mineral oil softening agent, the rosin being present in a predominating proportion, and the alkaline earth hydroxide or oxide and mineral oil softening agent in a relatively minor proportion so as to allow free rosin to be present, the amount of mineral oil softening agent being considerably greater than the amount of alkaline earth hydroxide or oxide, said insoluble soap and mineral oil softening agent being dissolved in a volatile hydrocarbon solvent.

7. A non-alkaline solution for the binding and stiffening of mineral wool fibers comprising the water-insoluble soap resulting from reacting together a mixture of rosin, an alkaline earth hydroxide or oxide, and a softening agent consisting principally of mineral oil and wax, the rosin being present in a predominating proportion, and the alkaline earth material and said softening agent in a relatively minor proportion so as to allow free rosin to be present, the amount of said softening agent being considerably greater than the amount of alkaline earth hydroxide or oxide, said insoluble soap and said softening agent being dissolved in a volatile hydrocarbon solvent.

8. A non-alkaline solution for the binding and stiffening of mineral wool fibers comprising the water-insoluble soap resulting from reacting together a mixture of rosin, calcium hydroxide or oxide, and a mineral oil softening agent, the rosin being present in a predominating proportion, and the calcium hydroxide or oxide and mineral oil softening agent in a relatively minor proportion so as to allow free rosin to be present, the amount of mineral oil softening agent being considerably greater than the amount of calcium hydroxide or oxide, said calcium resinate soap and mineral oil softening agent being dissolved in a volatile hydrocarbon solvent.

9. A non-alkaline solution for the binding and stiffening of mineral wool fibers comprising the water-insoluble soap resulting from reacting about 70 parts by weight of rosin with about 5 parts by weight of calcium hydrate, in the presence of about 20 parts by weight of mineral oil, and 5 parts by weight of paraffine, said reaction product being dissolved in a volatile hydrocarbon solvent.

10. As a new article of manufacture, an impregnated felt of inorganic non-combustible fibers coated and felted together with a mixture of a plasticized rosin having a melting point of at least 100° F., said plasticized rosin being normally incapable of causing the felt to be self-sustaining at high temperatures, and a water insoluble metal rosinate soap, the latter being present in the mixture in a ratio varying between one-third and two-thirds of the rosin, said impregnated felt being self-sustaining at a temperature of approximately 140° to 150° F. due to the presence of said metal soap.

11. As a new article of manufacture, an impregnated mineral wool felt of inorganic non-combustible fibers coated and felted together with a mixture of a plasticized rosin having a melting point of at least 100° F., said plasticized rosin being normally incapable of causing the felt to be self-sustaining at high temperatures, and a water insoluble metal rosinate soap, the latter being present in the mixture in a ratio varying between one-third and two-thirds of the rosin, said impregnated felt being self-sustaining at a temperature of approximately 140° to 150° F. due to the presence of said metal soap.

JESSE HOWELL GREGORY.